United States Patent [19]

Miyazaki et al.

[11] Patent Number: 5,532,757
[45] Date of Patent: Jul. 2, 1996

[54] APC AND ACC PROCESSING USING COMMON CIRCUITRY

[75] Inventors: Shinichirou Miyazaki, Kanagawa; Kazuo Watanabe, Chiba, both of Japan

[73] Assignee: Sony Corporation, Tokyo, Japan

[21] Appl. No.: 267,677

[22] Filed: Jun. 29, 1994

[30] Foreign Application Priority Data

Jul. 1, 1993 [JP] Japan ................................. 5-163432

[51] Int. Cl.$^6$ .......................... H04N 9/455; H04N 9/68
[52] U.S. Cl. ...................... 348/646; 348/539; 348/505
[58] Field of Search ................................... 348/645, 646, 348/647, 648, 662, 505, 506, 539, 710, 713; H04N 9/45, 9/455, 9/68

[56] References Cited

U.S. PATENT DOCUMENTS

| | | | |
|---|---|---|---|
| 4,291,332 | 9/1981 | Kato et al. ............................... | 348/539 |
| 4,539,583 | 9/1985 | Flamm et al. ........................... | 348/646 |
| 4,543,600 | 9/1985 | Bolger ..................................... | 348/539 |
| 4,635,103 | 1/1987 | Steckler et al. ......................... | 348/505 |
| 4,689,665 | 8/1987 | Johannes et al. ....................... | 348/646 |
| 4,797,730 | 1/1989 | Smith ...................................... | 348/539 |
| 4,809,059 | 2/1989 | Flamm et al. ........................... | 348/646 |
| 5,355,172 | 10/1994 | Adams et al. ......................... | 348/539 X |

FOREIGN PATENT DOCUMENTS

| | | | |
|---|---|---|---|
| 0074597 | 3/1983 | European Pat. Off. ....... | H04N 5/535 |
| 0095543 | 12/1983 | European Pat. Off. ....... | H04N 9/535 |
| 0202015 | 11/1986 | European Pat. Off. .......... | H03L 7/08 |
| 0461896 | 12/1991 | European Pat. Off. ......... | H04N 9/64 |
| 2128442 | 4/1984 | United Kingdom ............ | H04N 5/52 |
| 2157106 | 10/1985 | United Kingdom ............. | H04N 5/52 |
| WO92/17034 | 10/1992 | WIPO .............................. | H04N 9/45 |

*Primary Examiner*—Victor R. Kostak
*Assistant Examiner*—John W. Miller
*Attorney, Agent, or Firm*—William S. Frommer; Alvin Sinderbrand

[57] ABSTRACT

Chrominance signals of a digitized composite video signal are processed by including automatic phase control and automatic chroma control operations that use circuit elements that are concurrently available for both operations as well as for other signal processing operations. The automatic phase control operation calculates a phase error corresponding to a phase difference between a reference clock signal and a burst synchronization signal of the chrominance signal. The reference clock signal is generated in response to the phase error data, such that the phase error is minimized and the reference clock signal coincides with the burst synchronization signal. The automatic chroma control operation multiplies the chrominance signal by coefficient data corresponding to the difference between the chrominance signal and a reference value to generate a constant level chrominance signal.

13 Claims, 8 Drawing Sheets

APC AND ACC PROCESSING USING COMMON CIRCUITRY

BACKGROUND OF THE INVENTION

The present invention relates to apparatus and methods for processing chrominance signals of a composite video signal, and, more particularly, to apparatus and methods which incorporate automatic phase control (APC) and automatic chroma control (ACC) operations in processing chrominance signals.

Figure 1A:
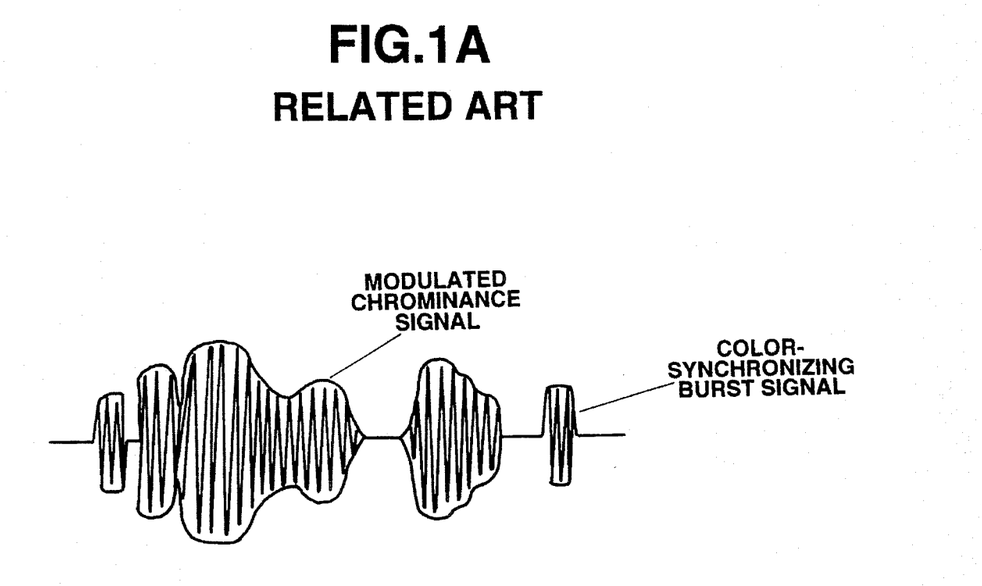
FIGS. 1A and 1B are diagrams respectively illustrating a chrominance signal and a combined luminance and chrominance signal of a video signal.
Figure 1B:
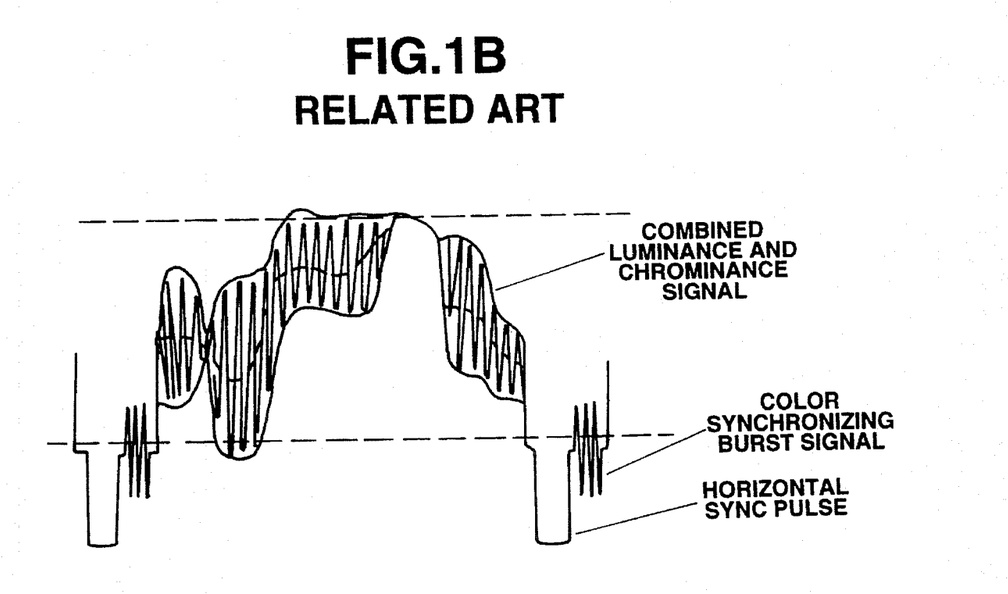

A composite video signal includes a modulated color sub-carrier signal (chrominance signal), shown in FIG. 1A, combined with a monochrome signal (luminance signal) and shown in FIG. 1B. The chrominance signal contains information regarding the color portion of an image, and this information is represented by both the amplitude and phase of the chrominance signal. Because color information is stored in the phase of the signal, an operation that processes the chrominance signal must be closely synchronized with the phase of the signal to avoid loss of color information, such as the tint or hue of an image recreated from the processed signal. Preferably, the phase of the processing operation should be within 2° of the chrominance signal.

To maintain a precise phase relationship between the transmitted chrominance signal and a chrominance signal processing operation, a color synchronizing burst signal, shown in FIG. 1A, is transmitted with the chrominance signal to provide a phase reference for the processing operation. The color synchronizing burst is a short, unmodulated signal usually consisting of nine cycles and is located on the back-porch of the horizontal blanking interval, after the horizontal sync pulses.

A chrominance processing operation uses the color synchronizing burst to generate an internal reference signal. The reference signal is generated by an Automatic Phase Control (APC) operation which separates and amplifies the color synchronizing burst signal, and then locks the phase of a local reference oscillator of the same frequency as the burst signal to the phase of burst signal.

Figure 2:
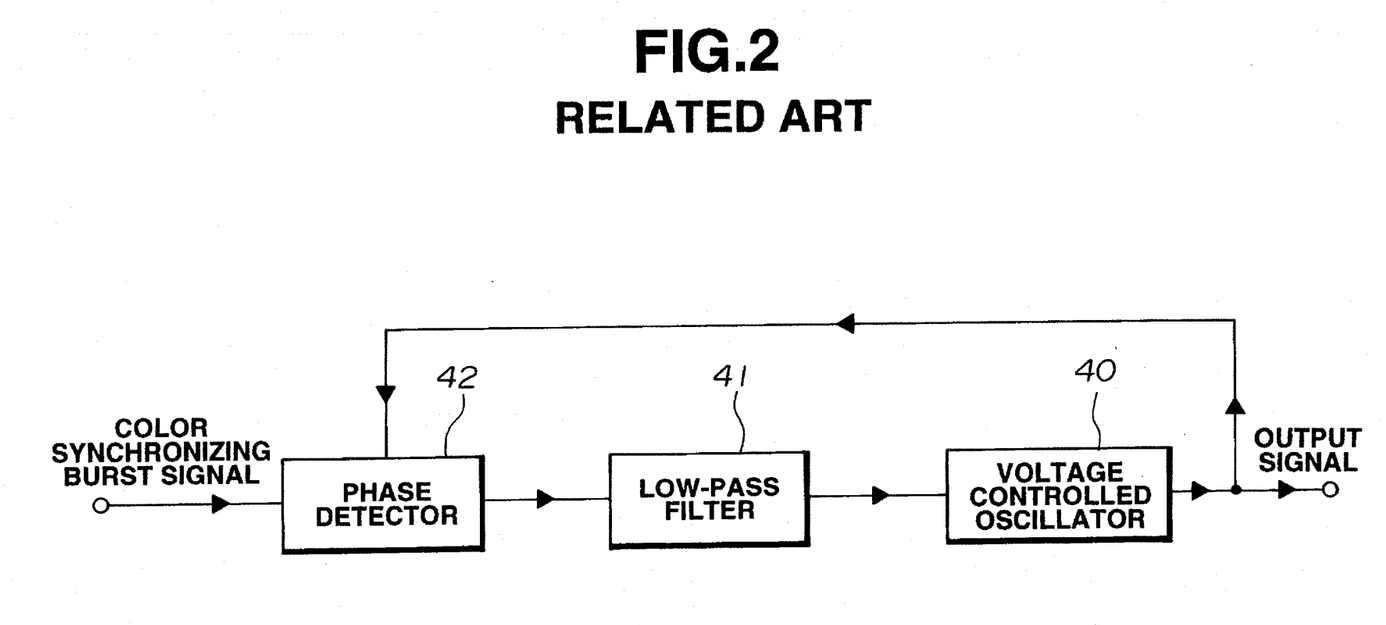
FIG. 2 is a block diagram showing a known analog automatic phase control circuit.

In analog chrominance signal processing, the phase-locking is usually provided by a phase locked-loop, as shown in FIG. 2, or a phase controlled oscillator. Typically, the phase-locked loop is formed by a DC voltage controlled oscillator (VCO) 40, which generates the internal reference signal, in combination with a phase detector 42 and a low pass filter 41. The phase detector 42 is supplied with the VCO output signal and the color synchronizing burst signal and generates a DC output having polarity and amplitude proportional to the direction and magnitude of the relative phase difference between the VCO output signal and the color synchronizing burst signal. The DC output is filtered by the low pass filter 41 and supplied to the VCO 42 to control the phase of the oscillator output signal. The DC output is varied until the phase of the oscillator output signal matches the phase of the color synchronizing burst signal. The low pass filter 41 modifies the dynamic performance of the phase locked loop by changing the DC loop gain.

To achieve proper balance between the color and the luminance amplitudes, and thus avoid oversaturation of bright colors in a reproduced image, the gain of the chrominance signal must be maintained at a constant level to compensate for changes in the chrominance signal caused by variations in scenes, transmission, propagation and receiver fine tuning. Typically, the color and the luminance amplitudes are balanced by an Automatic Chroma Control (ACC) operation provided by a feedback system which detects the amplitude of the color synchronizing burst signal and supplies a DC voltage to an amplifier to maintain the burst signal at a constant level and thus prevent the maximum amplitude of the chrominance signal from exceeding a predetermined value.

Figure 3:
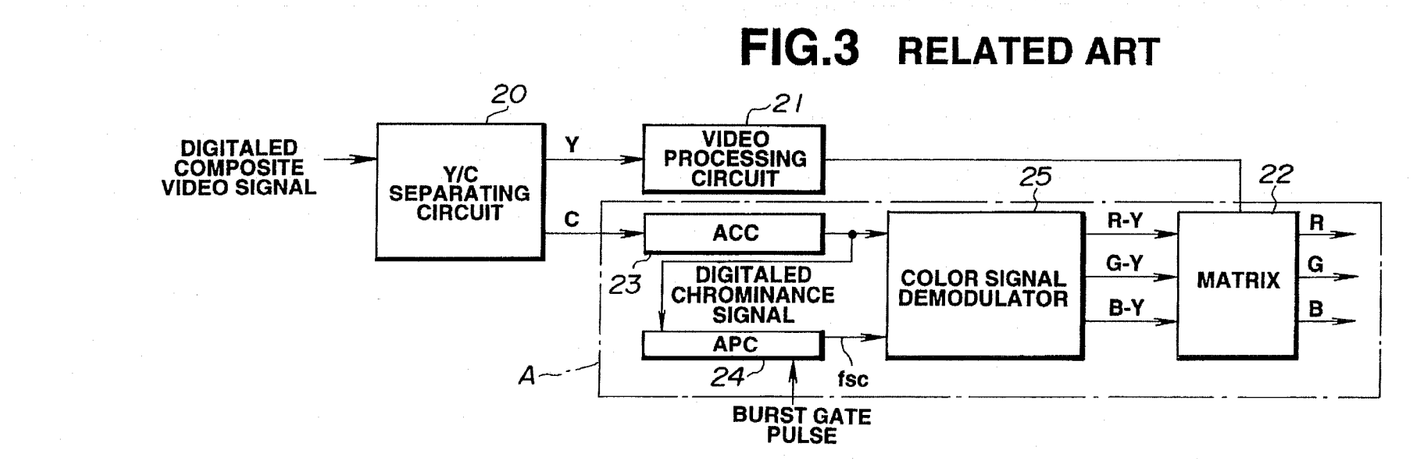
FIG. 3 is a block diagram showing a known digital chrominance signal processing circuit.

Similarly, in digital chrominance signal processing, APC and ACC operations are necessary. As an example, FIG. 3 illustrates a known circuit for processing a digitized composite video signal to generate primary color signals. The circuit includes a Y/C separating circuit 20, a video processing circuit 21, an automatic chroma control (ACC) circuit 23, an automatic phase control (APC) circuit 24, a color signal demodulator 25, and a matrix circuit 22.

The Y/C separating circuit 20 separates the composite digital video signal into a portion representing a digitized luminance signal (Y signal) and a portion representing a digitized chrominance signal (C signal). The Y/C separating circuit 20 delivers the Y signal to the video processing circuit 21 which functions to amplify the Y signal, perform additional processing operations and deliver the processed Y signal to matrix circuit 22.

The Y/C separating circuit 20 also delivers the C signal to the ACC circuit 23 which operates to balance the amplitude of the C signal to provide a constant level C signal. The ACC circuit delivers the constant level C signal to the automatic phase control (APC) circuit 24 and to the color signal demodulator circuit 25.

The APC circuit 24 responds to a burst gate pulse signal to process the constant level C signal to generate a reference clock signal $f_{sc}$ having a phase locked to the color synchronizing burst signal. The APC circuit 24 also generates a sampling clock signal of frequency $4f_{sc}$. The APC circuit 24 delivers the sampling clock signal $4f_{sc}$ to the color signal demodulator circuit 25 which uses the sampling clock signal as an internal reference clock for demodulating the constant level C signal delivered by ACC circuit 23. The color signal demodulator circuit 25 recovers color difference signals R-Y, G-Y and B-Y by sampling the C signal under the timing of the sampling clock signal $4f_{sc}$ and delivers the color difference signals to matrix circuit 22 which linearly cross-mixes the color difference signals R-Y, G-Y and B-Y with the Y signal in predetermined proportions to produce primary color signals R, G and B.

Figure 4:
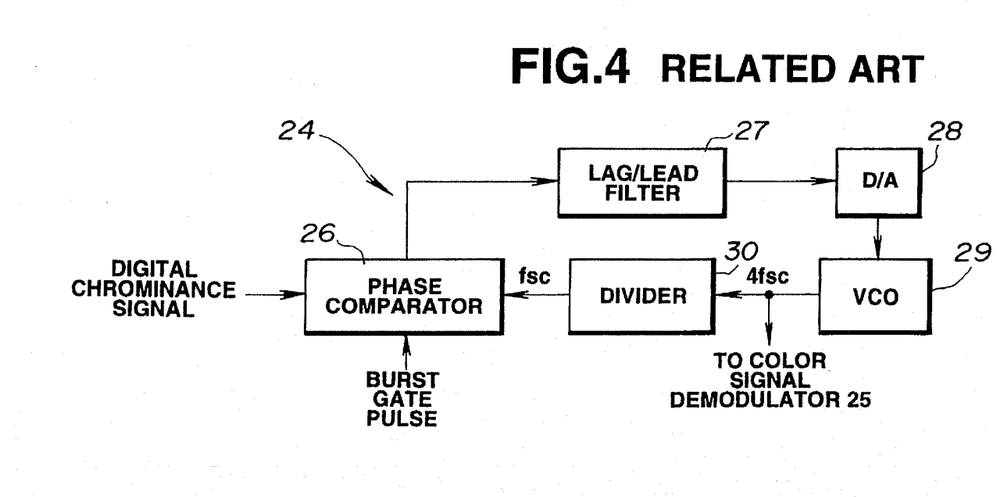
FIG. 4 is a block diagram showing the automatic phase control circuit of the known chrominance signal processing circuit of FIG. 3.

FIG. 4 illustrates the APC circuit 24 shown in FIG. 3. Generally, the APC circuit 24 phase-locks the reference clock signal $f_{sc}$ to the phase of the color synchronizing burst signal in a manner analogous to the analog APC circuit shown in FIG. 2. As shown in FIG. 4, the APC circuit includes a phase comparator circuit 26, a lag/lead filter circuit 27, a digital-to-analog (D/A) converter circuit 28, a voltage controlled oscillator (VCO) circuit 29 and a frequency divider circuit 30 sequentially arranged to form a phase-locked loop.

The phase comparator circuit 26 is operative to separate the color synchronizing burst signal portion of the digitized chrominance signal using the burst gate pulse signal as a reference. The phase comparator circuit 26 compares the phase data derived from the color synchronizing burst signal portion of the C signal with the reference clock signal $f_{sc}$ and delivers a digital signal representing the direction and magnitude of the relative phase difference between the color synchronizing burst signal and the reference clock signal $f_{sc}$ to the lag/lead filter 27. The lag/lead filter 27 operates to modify the dynamic performance of the phase locked loop in a manner analogous to that of the low pass filter 41 of the analog circuit of FIG. 2, and the lag/lead filter 27 delivers filtered digital output to D/A converter 28. The filtered digital output is converted to an analog DC output by D/A converter 28 which delivers the DC output to the VCO 29. The VCO 29 generates a sampling clock signal $4f_{sc}$ having a frequency four times that of the reference clock signal and having a phase controlled by the DC output and delivers the sampling clock signal to the frequency divider 30 to generate the reference clock signal $f_{sc}$.

As in the analog APC circuit, the relative phase difference between the color synchronizing burst signal and the reference clock signal causes the VCO 29 to generate a sampling clock signal $4f_{sc}$ of different phase such that the relative phase difference is smaller. The phase of the sampling clock signal is varied until the relative phase difference between the color synchronizing burst signal and the reference clock signal is eliminated. When the relative phase difference is eliminated, the phase of the sampling clock and reference clock signals remain constant, and the APC circuit is phase locked.

Figure 5:
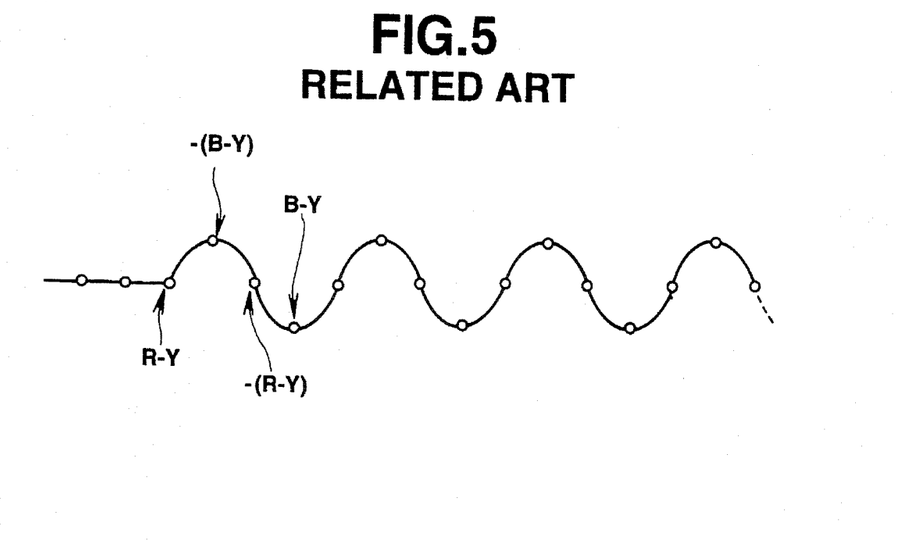
FIG. 5 is a diagram illustrating the desired locations from which the chrominance signal waveform is sampled.

FIG. 5 illustrates the analog chrominance signal from which the digitized chrominance signal is generated and shows locations corresponding to those sampled by the color signal demodulator circuit 25. When the APC circuit 24 is properly phase locked, the APC circuit 24 delivers the sampling clock signal $4f_{sc}$ to the color signal demodulator circuit 25 to time the chrominance signal sampling such that the chrominance signal is sampled at those locations whereat the color difference values B-Y and the color difference values R-Y are indicated. The phase locking of the APC circuit thus allows recovery of the B-Y and R-Y color difference signals in one sampling operation.

Figure 6:
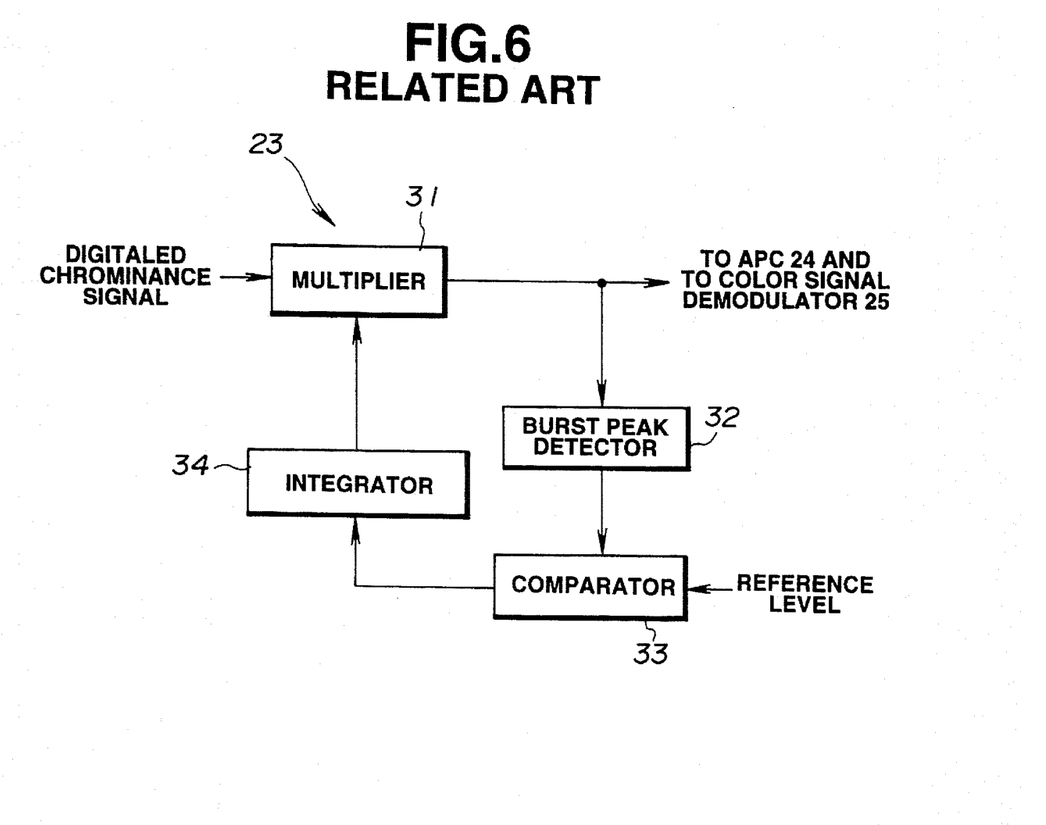
FIG. 6 is a block diagram showing the automatic chroma control circuit of the known chrominance signal processing circuit of FIG. 3.

FIG. 6 illustrates the ACC circuit 23 shown in FIG. 3. Generally, the ACC circuit operates in a manner analogous to the ACC circuit used in processing analog chrominance signals and prevents the maximum amplitude represented by the digital chrominance signal from exceeding a predetermined value. As shown in FIG. 6, the ACC circuit includes, in sequence, a multiplier circuit 31, a burst peak detector circuit 32, a comparator circuit 33 and an integrator circuit 34 arranged to form a feedback loop.

The multiplier 31 is operative to deliver the digitized chrominance signal to burst detector 32 which detects the maximum amplitude of the color synchronizing burst signal and supplies the detected maximum amplitude to the comparator circuit 33. The comparator circuit 33 compares the detected maximum amplitude to a reference level and forms a difference signal representing the difference between the detected maximum amplitude and the reference level. The comparator circuit 33 delivers the difference signal to the integrator circuit 34 which integrates the difference signal over a time period, such as over one horizontal line period, to calculate coefficient data which correspond to the difference between the detected maximum amplitude and the reference level. The integrator circuit 34 supplies the coefficient data to multiplier circuit 31 which multiplies each component of the chrominance signal by a portion of the coefficient data to modify the amplitude of the C signal and generate a digital chrominance signal having a constant level. The multiplier 31 delivers the constant level chrominance signal to the APC circuit 24 for phase locking and to the demodulator circuit 25 for separation of the color difference signals, as well as to the burst peak detector 32 for further level balancing.

As shown in FIG. 3, the known digital chrominance signal processing circuit has the drawback that the circuit elements are dedicated to only one operation. The APC circuit elements are used only for the APC operation and are not available for other signal processing operations, such as for the ACC operation, though the two operations have overlapping functions. Likewise, the ACC circuit elements are available only for the ACC operation and are not available for other signal processing operations, such as the APC operation. Because the circuit elements are dedicated to only one operation, the number of circuit elements used in the signal processing circuit is greatly increased and the size of the circuit is likewise increased. Furthermore, because separate circuit elements are used to perform overlapping functions in several operations, the circuit elements are used inefficiently.

OBJECTS AND SUMMARY OF THE INVENTION

Therefore, an object of the present invention is to provide apparatus and methods for processing chrominance signals which avoid the aforementioned disadvantages of the related art.

Another object of the present invention is to provide apparatus and methods for processing chrominance signals in which automatic phase control and automatic chroma control operations are performed using circuit elements that are available for both operations.

A further object of the present invention is to provide apparatus and methods for processing chrominance signals in which automatic phase control operations or automatic chroma control operations are carried out using circuit elements that are also available for other chrominance signal processing operations.

In accordance with an aspect of this invention, an apparatus for and a method of processing a chrominance signal containing a burst synchronization signal generates a sequence of addresses as a function of a reference clock signal. Respective samples of a portion of the chrominance signal are stored at the respective addresses. Phase error data indicative of a phase difference between the reference clock signal and the burst synchronization signal is calculated as a function of the samples. The reference clock signal is then generated from the phase error data in a manner that minimizes the phase error data and causes the reference clock signal to coincide with the burst synchronization signal.

In accordance with this aspect of the invention, a latched burst gate control signal may be generated as a function of a burst gate control signal and the reference clock signal to control switching of the portion of the chrominance signal and so enable the storing of the portion of the chrominance signal. The generating of the sequence of addresses may be reset in accordance with the latched burst gate control signal.

In further accordance with this aspect of the invention, the phase error data may be calculated by calculating respective differences between selected ones of the samples and then averaging these differences, and the averages may be lag-lead filtered. The phase error data may be accumulated over a horizontal scan period, and the accumulated phase error data stored in a register. A sub-carrier clock signal, from which the reference clock signal is generated, may also be generated.

As another aspect of the present invention, an apparatus for and a method of processing a chrominance signal stores a portion of the chrominance signal by storing respective samples of the portion at respective ones of a sequence of addresses, and difference data is derived from adjacent samples. Coefficient data corresponding to the difference data is stored and multiplied by the portion of the chrominance signal to form a constant level chrominance signal. The constant level chrominance signal is then stored.

In accordance with this aspect of the invention, the difference data may be calculated by calculating respective sums of absolute values of the adjacent samples and then determining a maximum value of the respective sums. A reference value may be subtracted from the maximum value to form the difference value, and the difference value may be integrated over a horizontal scan period. Coefficient data that correspond to the integrated reference value may then be selected.

In accordance with a further aspect of the present invention, an apparatus for and a method of processing a chrominance signal incorporates both of the above-described aspects of the present invention.

The above, and other objects, features and advantages of the present invention will be apparent from the following detailed description of the preferred embodiments of the present invention when read in conjunction with the accompanying drawings in which corresponding parts are identified by the same reference numeral.

DETAILED DESCRIPTION OF THE PREFERRED EMBODIMENT

The present invention incorporates automatic phase control and automatic chroma control operations into the processing of chrominance signals by using circuit elements that are available for both operations as well as for other chrominance signal processing operations.

Figure 7:
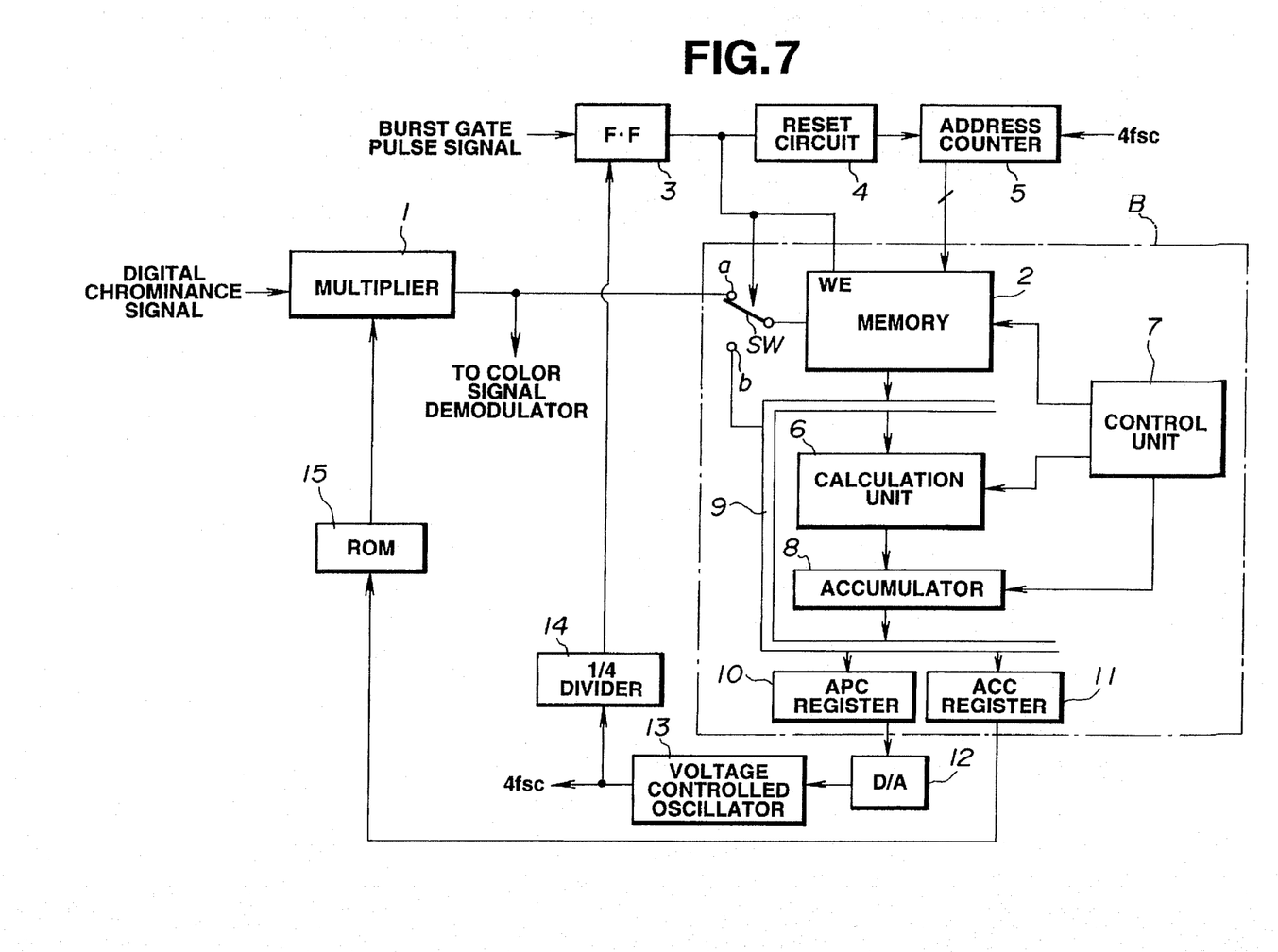
FIG. 7 is a block diagram showing a chrominance signal processing circuit according to an embodiment of the present invention.

FIG. 7 is a block diagram of a circuit for processing a digitized chrominance signal according to an embodiment of the present invention. The circuit shown in FIG. 7 is operable to perform APC and ACC operations and, as an example, is operable in place of the ACC circuit 23 and the APC circuit 24 shown in FIG. 3.

The digital chrominance signal processing circuit shown in FIG. 7 includes an automatic phase control (APC) phase locked loop and an automatic chroma control (ACC) feedback loop. The APC loop includes a flip-flop circuit 3; a reset circuit 4; an address counter 5; a microprocessor 16 including a memory 2, a calculation unit 6, an accumulator 8, a data bus 9 and an APC register 10 under the control of a control unit 7; a D/A converter 12; a voltage controlled oscillator (VCO) 13; and a frequency divider 14. The ACC loop includes a multiplier 1; a memory 2, calculation unit 6, accumulator 8, data bus 9, and an ACC register 11 of the microprocessor 16 under the control of the control unit 7; and a ROM 15.

Figure 8A:
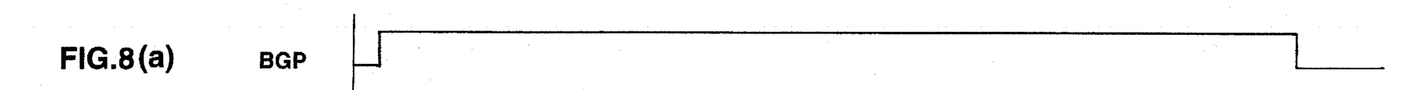
FIGS. 8A–8F are diagrams illustrating the signals and waveforms operated on by the chrominance signal processing circuit of FIG. 7.
Figure 8B:
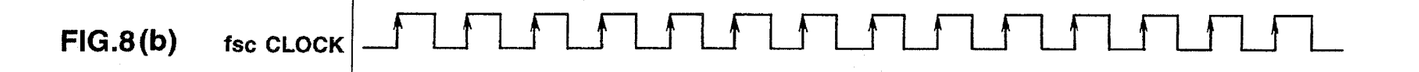
Figure 8C:
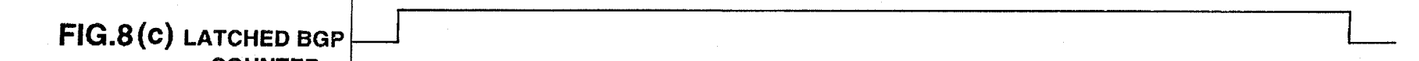

In the APC loop, a burst gate pulse signal (BGP) which coincides with the portion of the digital chrominance signal in which the color subcarrier data is stored, shown in FIG. 8(a), and a reference clock signal $f_{sc}$, shown in FIG. 8(b), are supplied to the flip-flop circuit 3. The flip-flop circuit 3, which may be a D-type flip-flop, is triggered to change the state of its output with the first rise in reference clock signal $f_{sc}$ that follows a change in the state of the burst gate pulse signal and thus generates a latched burst gate pulse signal having a duration of fourteen reference clock signal cycles, shown in FIG. 8(c).

Figure 8D:
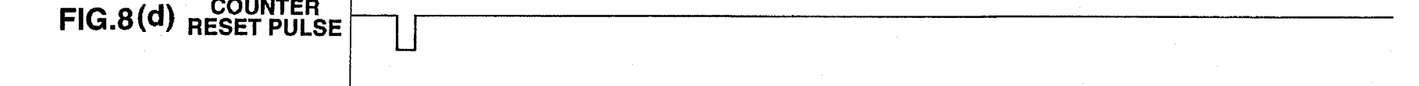

The flip-flop circuit 3 delivers the latched burst gate pulse signal to the reset circuit 4 which operates to detect a leading edge of the latched burst gate pulse signal and then supplies a counter reset pulse signal, shown in FIG. 8(d), to the address counter 5.

Figure 8E:
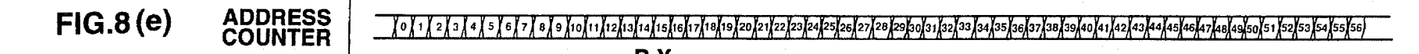

The address counter 5, in response to the counter reset pulse, initiates counting a sampling clock signal $4f_{sc}$ supplied by the VCO 13, and generates a sequence of addresses corresponding to the cycles of the sampling clock signal, shown in FIG. 8(e). The address counter 5 delivers a new address to memory 2 of microprocessor 16 with each increase in the count.

Figure 8F:
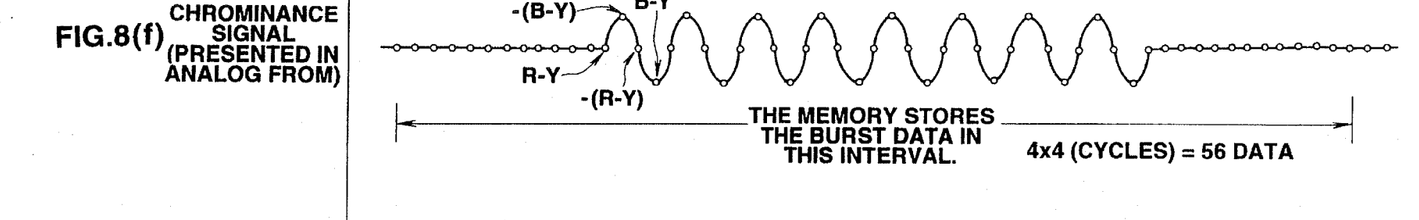

The flip-flop circuit 3 also delivers the latched burst gate pulse to the memory 2 and to a switch SW of the microprocessor 16. During the latched burst gate pulse signal interval, shown in FIG. 8(c), the switch SW contacts position "a" to connect the multiplier 1 to the memory 2. During this interval, the multiplier 1 delivers the digitized chrominance signal to the memory 2 which stores respective samples of the chrominance signal at the addresses supplied by the address counter 5. The digitized chrominance signal is sampled with each sampling clock signal $4f_{sc}$ which, when correctly in phase, correspond to the locations shown in the analog representation of the chrominance signal shown in FIG. 8(f).

During intervals other than the latched burst gate pulse interval, the switch SW contacts position "b" to connect the memory 2 to the data bus 9, and additional data is delivered to the memory 2, as described below.

The memory 2 delivers the samples of the chrominance signal to the calculation unit 6 via the data bus 9 under the control of the control unit 7. The calculation unit 6 calculates phase error data as a function of the samples of the chrominance data and delivers the phase error data to the accumulator 8 which accumulates the phase error data over a time period, such as during a horizontal line scan period. The accumulator 8 delivers the accumulated phase error data to the memory 2 for storage therein and to the APC register 10 for temporary storage. The accumulator 8 and the APC register 10 function in a manner well known in the art.

The APC register 10 delivers the stored phase error data to the D/A converter circuit 12 which converts the phase error data to an analog DC output and delivers the DC output to the VCO 13. The VCO 13 generates a sampling clock signal $4f_{sc}$ and delivers the sampling clock signal to the frequency divider circuit 14 which generates the reference clock signal $f_{sc}$ which, as described above, is supplied to the flip-flop circuit 3. The VCO 13 also delivers the sampling clock signal $4f_{sc}$ to the address counter 5 for counting, as is also described above.

The VCO 13 and the frequency divider circuit 14, as a function of the phase error data, are caused to vary the phase of the sampling clock signal $4f_{sc}$ and the phase of the reference clock signal $f_{sc}$ such that the timing of the address counting and the timing of the chrominance signal sampling are changed which, in turn, changes the values of subsequently calculated phase error data.

Figure 9A:
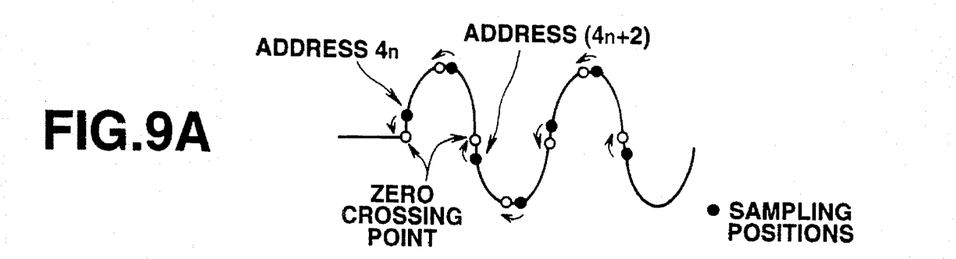
FIGS. 9A–9B are diagrams illustrating locations from which the chrominance signal waveform is sampled by the chrominance signal processing circuit of FIG. 7 when a phase error is present.
Figure 9B:
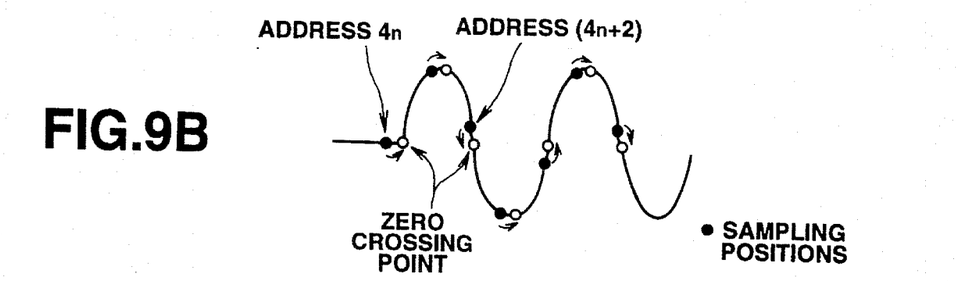

FIGS. 9A and 9B show the analog chrominance signal from which the digitized chrominance signal is derived and illustrate the effect of the phase of the sampling clock signal $4f_{sc}$, and accordingly the effect of the timing of the chrominance signal sampling, on the values of the phase error data. As shown in FIG. 9A, when the chrominance signal is sampled at a later time than desired, as represented by the dark dots, the phase error data represents a positive shift and effects a change in the phase of the sampling clock signal such that subsequent sampling of the chrominance signal occurs earlier in time, and in turn reduces the values of subsequently calculated phase error data. Likewise, as shown in FIG. 9B, when the chrominance signal is sampled at an earlier time than is desired, the phase error data represents a negative shift and effects a change in the phase of the sampling clock signal such that subsequent sampling of the chrominance signal occurs later in time and in turn reduces the values of the subsequently calculated phase error data.

Thus, the phase of the sampling clock signal is varied until the values of the phase error data are at a minimum. When the phase error data are at a minimum, the phase of the sampling clock and reference clock signals remain constant, and the APC loop is phase locked.

The phase error data is stored in memory 2 for subsequent correction of the samples of the chrominance signal.

The manner in which the calculation unit 6 calculates the phase error data will now be described with reference to the flow diagram depicted in FIG. 10. Generally, the calculation unit 6 determines the phase difference values as a function of the respective differences between selected samples of the chrominance signal.

Figure 10:
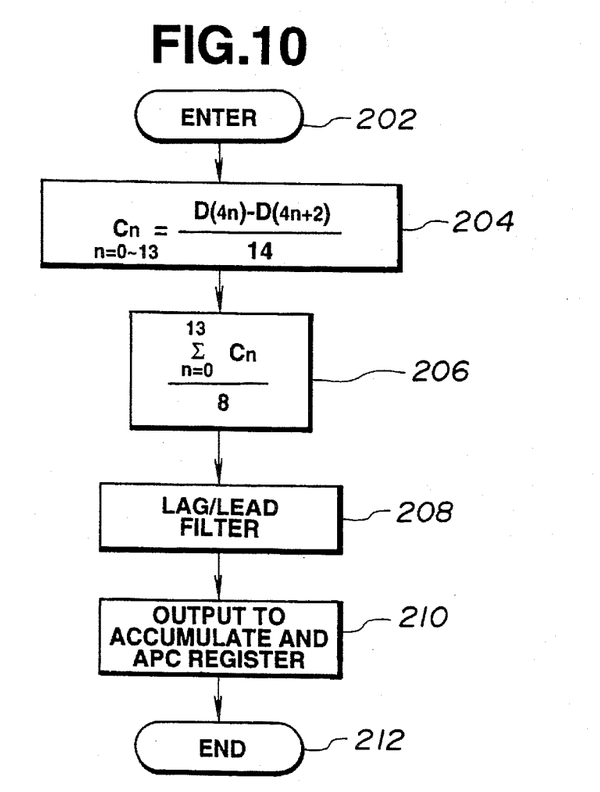
FIG. 10 is a flow chart referred to in explaining the automatic phase control operation of the chrominance signal processing circuit of FIG. 7.

As shown in FIG. 10, the calculation unit 6 of the microprocessor 16 calculates a plurality of difference values $C_n$ by determining the difference between values D representing alternately sampled locations of the chrominance signal, namely the sampled locations nearest the zero crossing points shown in FIGS. 9A–9B and then halving the respective differences, as shown at step 204. The determination of the values $C_n$ are summarized in the following manner:

$$C_n = \frac{D(4n) - D(4n+2)}{2}$$

wherein 4n and 4n+2 represent the indices of the addresses shown in FIGS. 8(e) and 9A–9B, and n=0–13. The calculation unit 6 calculates the $C_n$ and delivers each $C_n$ to the memory 2 via the data bus 9 for storage in the memory 2.

After the fourteen respective values of $C_n$ are calculated and stored, the calculation unit 6 averages the $C_n$, summarized in the following manner:

$$C_{n,average} = \frac{\sum_{n=0}^{13} C_n}{14}$$

The calculation unit 6 lag/lead filters the value $C_{n,\,average}$, as shown at step 208, to generate the phase error data and the calculation unit 6 delivers the phase error data to the memory 2 via the data bus 9 and the switch SW.

As shown at step 210, the calculation unit 6 also delivers the phase error data to the accumulator 8 which accumulates the phase error data over a time period, as described above, and the accumulated phase error data is delivered via the data bus 9 to the APC register 10 for storage. The APC register 10 outputs the stored accumulated phase error data from the microprocessor 16 and delivers the accumulated phase error data to the D/A converter 12, as is also described above.

In the ACC loop, shown in FIG. 7, the multiplier 1 delivers the digitized chrominance signal to the memory 2 of the microprocessor 16 via switch "a" during the latched burst gate pulse signal interval, and the memory 2 stores the respective samples of the chrominance signal during this interval, as described above. The memory 2 delivers the respective samples of the chrominance signal to the calculation unit 6 via the data bus 9.

The calculation unit 6 calculates difference data from adjacent samples of the chrominance signal and delivers the difference data to the accumulator 8 which accumulates the difference data over a time period, such as during a horizontal line scan interval, as is known in the art. The accumulator 8 delivers the accumulated difference data to the ACC register 11 via the data bus 9 wherein the accumulated difference data is stored, as is also known in the art. The ACC register 11 delivers the accumulated difference data to the ROM 15.

The ROM 15 stores coefficient data corresponding to possible difference data values and arranged in a data table. The ROM 15 retrieves the respective coefficient data corresponding to the difference data delivered by the ACC register 11 and delivers the retrieved coefficient data to the multiplier 1.

The multiplier 1 multiplies the digitized chrominance signal by the coefficient data and forms a digital chrominance signal having a constant level. The multiplier 1 delivers the constant level chrominance signal to a color signal demodulator circuit as, for example, shown in FIG. 4. The multiplier 1 also delivers the constant level chrominance signal to the memory 2 of the microprocessor 16, and the constant level chrominance signal is sampled and stored therein.

The ACC loop thus generates a constant level chrominance signal by multiplying the supplied digitized chrominance signal by coefficient data that correspond to difference data derived from the supplied digitized chrominance signal. The values of the coefficient data are selected such that difference data subsequently calculated from sampling the constant level digital chrominance signal have zero value.

Figure 11:
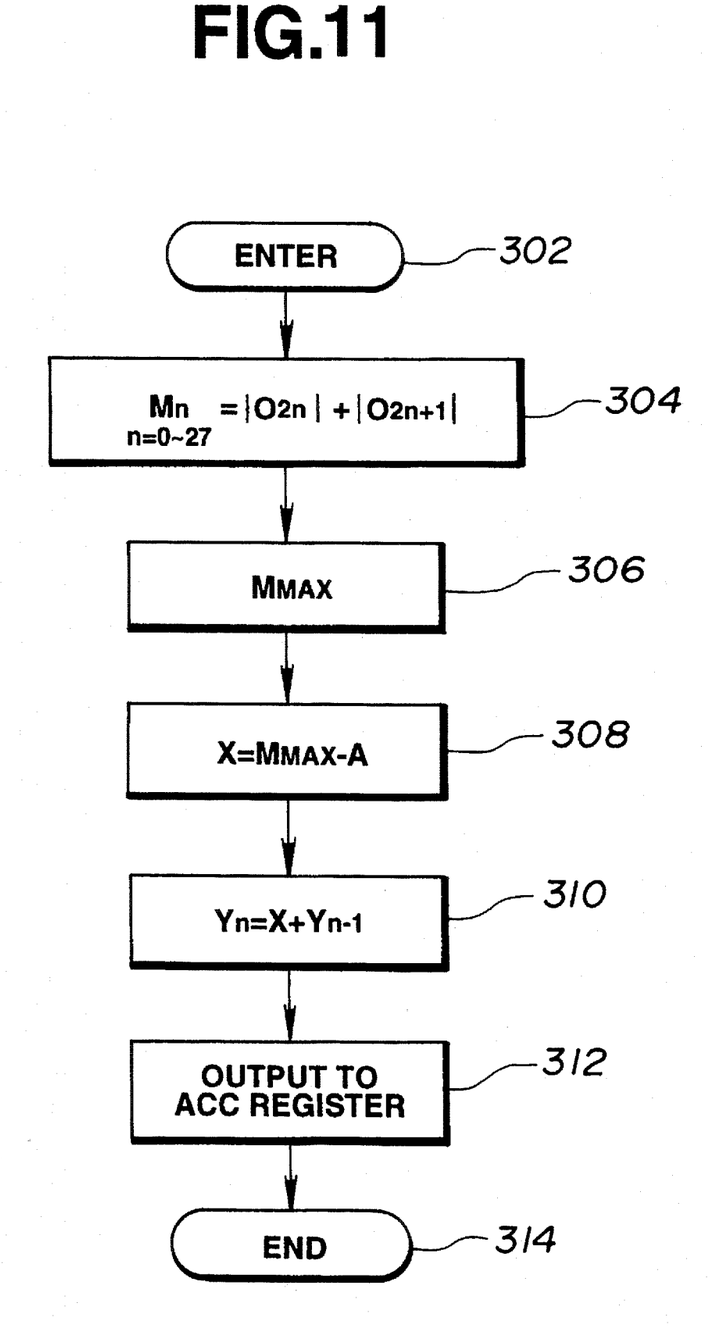
FIG. 11 is a flow chart referred to in explaining the automatic chroma control operation of the chrominance signal processing circuit of FIG. 7.

The manner in which the calculation unit 6 of the microprocessor 16 determines the difference data will now be described with reference to FIG. 11.

The memory 2 of the microprocessor 16 supplies the calculation unit 6 with the sampled digital chrominance signal. As shown in step 304, the calculation unit 6 calculates a plurality of values $M_n$ derived from the absolute values of adjacent samples, D, summarized in the following manner:

$$M_n = |D_{2n}| + |D_{2n+1}|$$

wherein 2n and 2n+1 represent the indices of the addresses shown in FIG. 8(e) and n=0–27. The calculation unit 6 delivers the values $M_n$ to the memory 2 via data bus 9.

As shown at step 306, the calculation unit 6 selects from the values $M_n$ the one having the maximum value, denoted by $M_{max}$.

The calculation unit 6, as shown at step 308, then calculates a difference value X by subtracting a reference value A from the maximum value $M_{max}$. The calculation unit 6 delivers the difference value X to the accumulator 8.

As shown at step 310, the accumulator 8 calculates an integrated difference value $Y_n$ by combining the difference value with a previously integrated difference value $Y_{n-1}$. The integrated difference value $Y_n$ is generated during a predefined period, such as during a horizontal line scan interval.

The accumulator 8 delivers the integrated difference value $Y_n$ to the ACC register 11 for storage, as shown in step 312. The ACC register 11 outputs the integrated difference value $Y_n$ from the microprocessor 16 and delivers the value $Y_n$ to the ROM 15 which retrieves coefficient data corresponding to the integrated difference value $Y_n$, as described above, and delivers this coefficient data to the multiplier 1.

Alternatively, the manner in which the calculation unit 6 calculates the difference values may be simplified and $M_{max}$ determined from the sampled digital chrominance signals stored at alternate addresses, such as at the odd indexed addresses 2n±1 of FIG. 8(e). As mentioned above, the sample having the maximum value is selected as $M_{max}$. However, it may be preferable to calculate the value $M_{max}$ using the steps shown in FIG. 11 when random noises are present in the chrominance signal, such as when the chrominance signal is derived from a weak broadcast signal.

As described above, the APC loop and the ACC loop of this embodiment of the present invention, shown in FIG. 7, each incorporate circuit elements used in both the APC and the ACC operations. Thus the number of circuit elements required by the circuit of FIG. 7 is reduced. Moreover, the circuit elements used in these operations are also available for other signal processing operations.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A chrominance signal processing apparatus including common circuitry for providing APC and ACC processing of a digitized chrominance signal containing a burst synchronization signal, comprising:

a source of reference clock signals;

address generating means for generating a sequence of addresses in response to said reference clock signals;

memory means for storing successive samples of said burst synchronization signal at respective ones of said sequence of addresses;

common calculating means for calculating differences between predetermined non-adjacent ones of said stored samples corresponding to zero crossings of the burst synchronization signal to derive phase error data indicative of a phase difference between said reference clock signals and said burst synchronization signal and for calculating differences between adjacent ones of said stored samples to derive burst level data;

adjustable phase oscillator means included in said source of reference clock signals for generating said reference clock signals in response to said phase error data such that said phase error data is minimized and said reference clock signals coincide with said burst synchronization signal;

a ROM for storing coefficient data in a table;

means for accessing said table with said burst level data to read out from said ROM coefficient data corresponding to said burst level data; and multiplying means supplied with said read out coefficient data for multiplying said digitized chrominance signal, including said burst synchronization signal, by said coefficient data to form a constant level chrominance signal and for supplying the multiplied signal to be stored in said memory means.

2. The apparatus of claim 1, further comprising a burst gate control signal source and latching means responsive to said reference clock signals for latching the burst gate control signal to extract said burst synchronization signal from the multipled signal to be stored in said memory means.

3. The apparatus of claim 2, further comprising reset means for resetting said address generating means to initiate generating said sequence of addresses when said burst gate control signal is latched.

4. The apparatus of claim 1, wherein said calculating means calculates respective differences between said predetermined non-adjacent samples and averages said respective differences to derive said phase error data.

5. The apparatus of claim 4, wherein said calculating means lag-lead filters said average to derive said phase error data.

6. The apparatus of claim 4, wherein said calculating means includes accumulator means for accumulating said respective differences over a horizontal scan period delivery to said oscillator means for generating said reference to average said respective differences and produce said phase error data.

7. The apparatus of claim 6, further comprising register means for storing said phase error data and for supplying the stored phase error data to said adjustable phase oscillator means.

8. The apparatus of claim 1, further comprising digital-to-analog converter means for converting said phase error data to an analog DC voltage.

9. The apparatus of claim 8, wherein said adjustable phase oscillator means comprises a voltage controlled oscillator for generating a sampling clock signal the phase of which is adjustable as a function of said analog DC voltage.

10. The apparatus of claim 9, wherein said source of reference clock signals includes frequency dividing means for frequency dividing said sampling clock signal to generate said reference clock signals.

11. The apparatus of claim 1, wherein said calculating means determines the absolute value of each stored sample, calculates respective sums of absolute values of said stored samples, determines a maximum value of said respective sums, and subtracts a reference value from said maximum value to derive said burst level data.

12. The apparatus of claim 11, wherein said calculating means includes accumulator means for accumulating the derived burst level data for a number of horizontal scan periods.

13. The apparatus of claim 12, wherein said ROM reads out coefficient data corresponding to the burst level data accumulated in said accumulator means.

* * * * *